United States Patent
Joshi (10) Patent No.: US 9,992,805 B2
(45) Date of Patent: Jun. 5, 2018

(54) APPARATUS FOR DISPLAYING IMAGES AND DRIVING METHOD THEREOF, MOBILE TERMINAL AND DRIVING METHOD THEREOF

(71) Applicant: SAMSUNG ELECTRONICS CO., LTD., Suwon-si (KR)

(72) Inventor: Shekhar Joshi, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 212 days.

(21) Appl. No.: 14/327,141

(22) Filed: Jul. 9, 2014

(65) Prior Publication Data

US 2015/0195860 A1    Jul. 9, 2015

(30) Foreign Application Priority Data

Jan. 6, 2014    (KR) .......................... 10-2014-0001407

(51) Int. Cl.
| | |
|---|---|
| *H04W 76/02* | (2009.01) |
| *H04W 74/00* | (2009.01) |
| *H04W 48/08* | (2009.01) |
| *H04W 76/04* | (2009.01) |
| *H04W 36/00* | (2009.01) |
| *H04W 76/00* | (2018.01) |
| *H04W 8/00* | (2009.01) |

(52) U.S. Cl.
CPC ......... *H04W 76/023* (2013.01); *H04W 36/00* (2013.01); *H04W 48/08* (2013.01); *H04W 74/006* (2013.01); *H04W 76/043* (2013.01); *H04W 8/005* (2013.01)

(58) Field of Classification Search
CPC ..... H04W 48/08–48/16; H04W 48/18; H04W 48/20; H04W 36/00; H04W 36/34; H04W 36/36; H04W 36/365; H04W 8/005; H04W 8/14; H04W 8/22; H04W 84/18; H04W 84/22; H04W 76/023; H04W 76/025; H04W 76/043
See application file for complete search history.

(56) References Cited

U.S. PATENT DOCUMENTS

2007/0230423 A1*   10/2007   Yoshida ............... H04W 76/02
                                                                370/338
2010/0014458 A1*   1/2010    Singh .................. H04W 72/048
                                                                370/328

(Continued)

*Primary Examiner* — Joshua Kading
(74) *Attorney, Agent, or Firm* — Sughrue Mion, PLLC (57) ABSTRACT

A mobile terminal is communicable with an image display apparatus connected to a nearby access point and includes: an interface configured to receive, from the access point, a signal including information on a current connection channel, by which the image display apparatus is currently connected to the access point, to transmit a request for connection with the image display apparatus by a same channel as the current connection channel, and to receive a response on the request; an information checker configured to check information on the current connection channel from the received signal; and a controller configured to request for connection with the image display apparatus by the same channel based on the checked information, to connect to the image display apparatus according to an approving result of the response on the request, and to control the image display apparatus in response to being connected.

17 Claims, 8 Drawing Sheets

(56) References Cited

U.S. PATENT DOCUMENTS

| | | | |
|---|---|---|---|
| 2012/0120892 A1* | 5/2012 | Freda | H04W 8/005 370/329 |
| 2013/0034023 A1* | 2/2013 | Jung | H04L 67/104 370/255 |
| 2013/0044739 A1 | 2/2013 | Huang | |
| 2013/0166759 A1* | 6/2013 | Rajamani | H04W 76/023 709/227 |
| 2014/0003237 A1* | 1/2014 | Kenney | H04W 28/10 370/235 |
| 2014/0349669 A1* | 11/2014 | Qi | H04W 76/023 455/454 |
| 2014/0351444 A1* | 11/2014 | Qi | H04L 67/16 709/227 |
| 2014/0366105 A1* | 12/2014 | Bradley | H04W 12/08 726/5 |
| 2015/0071147 A1* | 3/2015 | Yamaura | H04M 1/7253 370/311 |
| 2015/0351018 A1* | 12/2015 | Kim | H04W 48/16 370/338 |

* cited by examiner

APPARATUS FOR DISPLAYING IMAGES AND DRIVING METHOD THEREOF, MOBILE TERMINAL AND DRIVING METHOD THEREOF

CROSS-REFERENCE TO RELATED APPLICATION

This application claims priority from Korean Patent Application No. 10-2014-0001407, filed in the Korean Intellectual Property Office on Jan. 6, 2014, the disclosure of which is incorporated herein by reference in its entirety.

BACKGROUND

1. Field

Methods and apparatuses consistent with exemplary embodiments relate to reducing a Wi-Fi Peer to Peer (P2P) search time when a mobile terminal uses Wi-Fi and P2P at the same time.

2. Description of the Related Art

The Wi-Fi P2P technology, i.e., Wi-Fi direct, that was suggested by the Wi-Fi Alliance is capable of being directly connected with devices that provide Wi-Fi functions and communicate with one another without requiring an access point (AP), while being compatible with the related art Wi-Fi as well. Direct communication between devices is similar to the function provided by technologies such as Bluetooth, but Wi-Fi P2P is more advantageous than Bluetooth in terms of transmission range and data transmission speed, and thus Wi-Fi P2P function is taking the place of Bluetooth at a rapid pace. For example, Bluetooth 4.0 which is the latest Bluetooth standard supports up to 100 m transmission range and 24 Mbps transmission speed, but Wi-Fi direct supports up to 200 m transmission range and 300 Mbps transmission speed.

However, in the case of a related art Wi-Fi, there exists an ad hoc mode which supports direct connection, but due to its numerous disadvantages such as weak security, increased power consumption, and transmission bandwidth being limited to 11 Mbps, it is almost not in use.

Since the Wi-Fi P2P function was suggested in consideration of compatibility with a general Wi-Fi function of the related art, that is, a legacy Wi-Fi function, a user may attempt Wi-Fi P2P connection while using the legacy mode of the Wi-Fi. For example, while a mobile terminal is connected to a certain AP and operates in a legacy Wi-Fi station mode so that it can be provided with communication functions, a user may request for Wi-Fi P2P function to share files, etc.

However, creating a Wi-Fi P2P group consists of three processes, Device Discovery, Service Discovery and Group Creation, and it takes a great amount of time to execute the Wi-Fi P2P function.

SUMMARY

Exemplary embodiments may address at least the above problems and/or disadvantages and other disadvantages not described above. The exemplary embodiments are not required to overcome the disadvantages described above, and may not overcome any of the problems described above.

One or more exemplary embodiments provide an image display apparatus capable of reducing the Wi-Fi P2P search time when a mobile terminal uses Wi-Fi and Wi-Fi P2P at the same time, and a driving method of the image display apparatus, mobile terminal, and driving method of the mobile terminal thereof.

According to an aspect of an exemplary embodiment, there is provided a mobile terminal communicable with an image display apparatus connected to a nearby access point (AP), the mobile terminal including: an interface configured to receive a signal including information on the current connected channel from the access point, to receive a request for connection with the image display apparatus through a same channel as the current channel, and to receive a response on the request; an information checker configured to check information on the current channel from the received signal; and a controller configured to request for connection with the image display apparatus through the same channel based on the checked information, and to be connected to the image display apparatus according to a result of response to the request, and to control the image display apparatus.

The mobile terminal and the image display apparatus may be directly Wi-Fi connected to each other based on the checked information.

In response to the current connected channel of the image display apparatus being changed, the mobile terminal may be connected to the image display apparatus through the changed channel.

The mobile terminal may control the image display apparatus so that contents may be reproduced from the image display apparatus.

The mobile terminal may control the image display apparatus to operate as a screen mirror of the mobile terminal.

The interface may periodically receive a beacon frame as a signal including the information on the current channel.

The interface may include a wireless LAN module configured to perform wireless LAN communication with the access point; and a Wi-Fi direct module configured to perform Wi-Fi communication with the image display apparatus.

According to an aspect of an exemplary embodiment, there is provided an image display apparatus including: an interface configured to be connected to a nearby access point and transmit or receive data, and to receive a request for connection by a mobile terminal provided through a same channel as a channel connected to the access point; a controller configured to process whether to respond to the request for connection; and an operation executor configured to execute operations according to a control by the connected mobile terminal, in response to an approval to the request for connection.

The mobile terminal may be directly Wi-Fi connected with the image display apparatus by through the same channel.

In response to a current channel of the image display apparatus connected to the access point being changed, the mobile terminal may be connected to the image display apparatus through the changed channel.

The operation executor may reproduce contents according to a control by the mobile terminal.

The operation executor may operate as a screen mirror according to a control by the mobile terminal.

The operation executor may include a display configured to display the reproduced contents or to display a screen of the mobile terminal as the screen mirror.

According to an aspect of an exemplary embodiment, there is provided a driving method of a mobile terminal communicable with an image display apparatus connected to a nearby access point (AP), the method including: receiving, by an interface, a signal including information on the current connected channel from the access point; checking, by an information checker, information on the current channel from the received signal; requesting, by the interface, for connection with the image display apparatus through a same channel as the current channel based on the checked information, and receiving, by the interface, a response to the request; and a controller being connected to the image display apparatus and the controller controlling the image display apparatus according to a result of the response.

The mobile terminal and the image display apparatus may be directly Wi-Fi connected to each other.

In response to a current channel of the connected image display apparatus being changed, the mobile terminal may be connected to the image display apparatus through the changed channel.

The controlling may involve controlling the image display apparatus so that contents may be reproduced from the image display apparatus.

The controlling may involve controlling the image display apparatus to operate as a screen mirror of the mobile terminal.

The receiving a signal may involve periodically receiving a beacon frame as a signal including information on the current channel.

According to an aspect of an exemplary embodiment, there is provided a driving method of an image display apparatus, the method including: an interface being connected to a nearby access point and the interface transmitting or receiving data, and receiving a request for connection by a mobile terminal provided through a same channel as a channel connected to the access point; processing, by a controller, whether to respond to the request for connection; and executing operations, by an operation executor, according to a control by the connected mobile terminal, in response to an approval to the request for connection.

The mobile terminal may be directly Wi-Fi connected with the image display apparatus through the same channel.

In response to the current connected channel of the image display apparatus being changed, the mobile terminal may be connected to the image display apparatus through the changed channel.

The executing operations may involve reproducing contents according to a control by the mobile terminal.

The executing operations may involve operating as a screen mirror of the mobile terminal according to a control by the mobile terminal.

The executing operations may involve displaying the reproduced contents or displaying a screen of the mobile terminal as the screen mirror.

BRIEF DESCRIPTION OF THE DRAWINGS

The above and/or other aspects will become more apparent by describing certain exemplary embodiments with reference to the accompanying drawings, in which.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
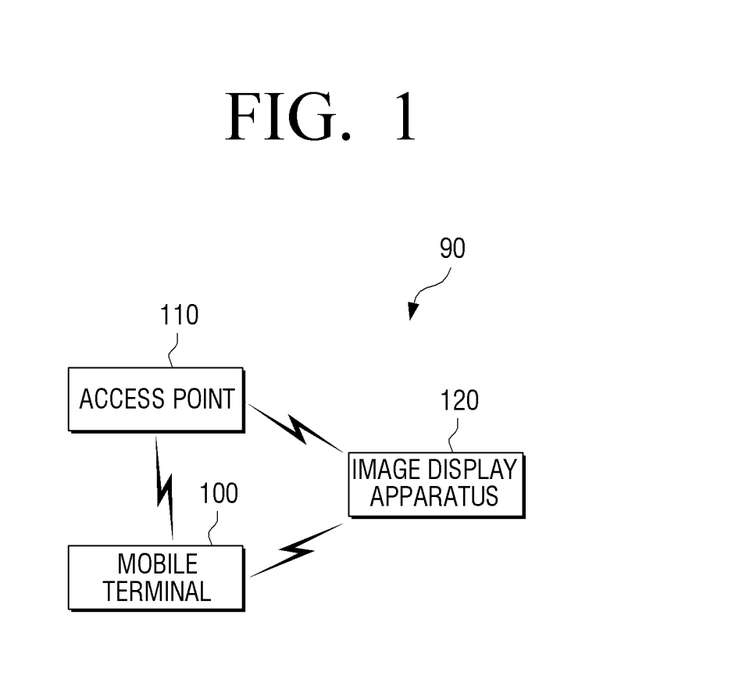
FIG. 1 is a view illustrating a P2P search system according to an exemplary embodiment.
Figure 2:
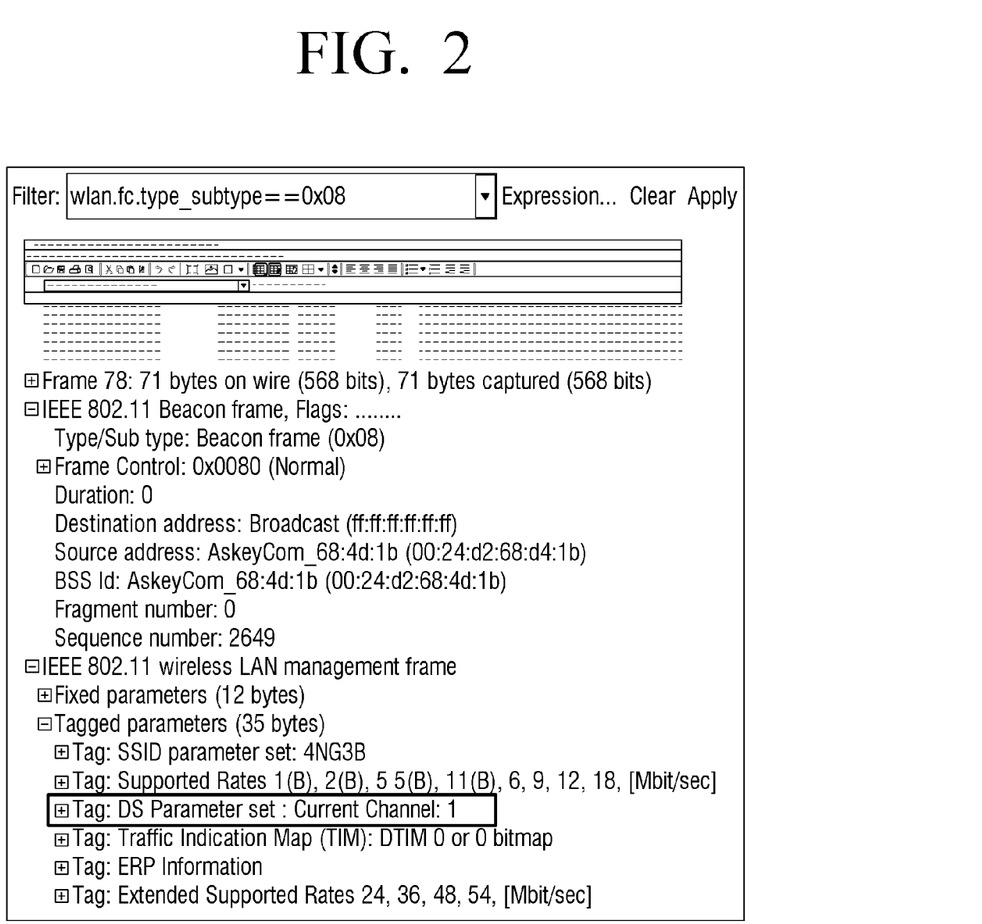
FIG. 2 is a view illustrating an example of a beacon frame according to an exemplary embodiment.

FIG. 1 is a view illustrating a P2P search system according to an exemplary embodiment, and FIG. 2 is a view of an example of a beacon frame according to an exemplary embodiment.

As illustrated in FIG. 1, the P2P search system 90 according to an exemplary embodiment includes a mobile terminal 100, i.e., device 100, access point 110, and image display apparatus 120.

The mobile terminal 100 may be a mobile phone such as a smart phone, notebook, tablet PC, or Personal Digital Assistant (PDA) for performing wired/wireless communication. Such a mobile terminal 100 may use multimedia services besides basic communication services such as voice and data communication, and thus may be provided with multimedia contents services such as videos and images. For this purpose, the mobile terminal 100 may access a nearby small base station, i.e., an access point (AP), through a short distance wireless communication (WLAN), and be provided with such services.

The mobile terminal 100 may directly access the image display apparatus 120. Prior to such a direct access, the mobile terminal 100 according to the exemplary embodiment checks whether there is a beacon signal being provided from a nearby access point 110. If there is a beacon signal, as illustrated in FIG. 2, the mobile terminal 100 checks whether there is information, in a beacon frame included in the beacon signal, or in a beacon frame provided by a separate request, on a current channel or operational channel connected with the image display apparatus 120 for which the mobile terminal 100 is pursuing direct access for. Of course, if the image display apparatus 120 is connected to the access point 110, information on the current channel would be included in the beacon frame, but if the image display apparatus 120 is not connected to the access point 110, information on the current channel would not be included in the beacon frame.

As such, if there is information on the current channel in the beacon frame upon checking as aforementioned, the mobile terminal 100 would directly access the image display apparatus 120 using a same channel as the current channel based on the corresponding information. For example, if the image display apparatus 120 is connected to the access point 110 by channel 7, the mobile terminal 100 would access the image display apparatus by the same channel 7. Herein, the channel may mean a certain frequency or operational frequency. In this process, the mobile terminal 100 may transmit a probe message to set for example a group owner, and receive a response thereto from the image display apparatus 120. Thus, the image display apparatus 120 would operate as a listener. More specifically, the basic operation for the apparatus search procedure performed in the process of creating a Wi-Fi P2P group is performed by exchanging the probe request of IEEE 802.11 MAC protocol and the probe response message. The probe request may include information such as P2P information element (IE), WSC IE and Supp Reg IE, and the probe response may include P2P IE, WSE IE, RSN IE and Supp Reg IE.

When such an operation is completed, the mobile terminal 100 may control the image display apparatus 120. For example, when the mobile terminal 100 is connected to the image display apparatus 120, the mobile terminal 100 may control the image display apparatus 120 to perform a mirroring operation, or control so that a mirroring operation is executed automatically. In other words, the screen of the mobile terminal 100 would be displayed on the image display apparatus 120 as well. Next, in the case of a user executing a certain contents through the mobile terminal 100, the image display apparatus 120 may reproduce the executed contents on the screen. Besides, the mobile terminal 100 would be able to execute various internal functions through the image display apparatus 120. In this regard, the mobile terminal 100 would be somewhat different from the concept of a remote control apparatus.

An access point 110 includes a small base station such as a femtocell or a picocell installed in a building. Herein, the difference between a femtocell and a picocell base station is made depending on the maximum number of mobile terminals and image display apparatuses that may be connected or expected to be connected. The access point 110 includes a short distance communication module such as Zigbee and Wi-Fi and so on for performing a short distance communication with the mobile terminal 100 and image display apparatus 120. In the exemplary embodiment, a short distance communication may be performed in various standards including Radio Frequency (RF) and Ultra Wideband (UWB) communication such as Bluetooth, Zigbee, IrDA, Ultra High Frequency (UHF) and Very High Frequency (VHF). Accordingly, the access point 110 may extract a location of a data packet, designate the best communication route for the extracted location, and transmit the data packet to the next apparatus, for example, the mobile terminal 100 and image display apparatus 120 according to the designated communication route. The access point 110 may share numerous lines in a general network environment, and may include a router, repeater, replay, and so on.

According to the exemplary embodiment, the access point 110 may be a small base station such as a wireless sharer provided in a household. In this case, for example when the image display apparatus 120 is currently connected, the access point 110 may transmit information on the current channel through the beacon signal. The mobile terminal 100 would receive such a beacon signal, and the access point 110 would transmit information on the current channel in a beacon frame format through the beacon signal, wherein the beacon frame may be received at a separate request by the mobile terminal 100.

According to the exemplary embodiment, the image display apparatus 120 may include a Digital Television (DTV). The image display apparatus 120 may be connected to the access point 110, enabling a user to view a particular broadcast program. The image display apparatus 120 may access the Internet and search for a particular site. As such, with the image display apparatus 120 connected to the access point 110 through short distance communication, for example, Wi-Fi communication, the image display apparatus 120 may receive a request message for accessing the mobile terminal 100, that is a probe request message, requesting for access by a same channel as the current accessed channel. The image display apparatus 120 may transmit a probe response message regarding the probe request message to the mobile terminal 100, thereby completing the setting for operating as a listener of the mobile terminal 100. Next, the image display apparatus 120 may perform a mirroring operation regarding the mobile terminal 100. In other words, the image display apparatus 120 would display a same screen as the screen of the mobile terminal 100. The image display apparatus 120 may perform operations of the mobile terminal 100. For example, in the case where contents inside the mobile terminal 100 are executed, those contents may be displayed on the screen of the image display apparatus 120. However, according to the exemplary embodiment, a mobile terminal 100 is distinguished from a remote controller.

The image display apparatus 120 may change the channel connected to the access point 110 upon a user's request. In this case, since the access point 110 periodically transmits information on the changed channel through the beacon signal to the mobile terminal 100, the mobile terminal 100 may continuously access the image display apparatus 120 based on the information on the changed channel, and the image display apparatus 120 may have continuity in reproducing the contents.

In an exemplary embodiment referring to FIG. 1, the mobile terminal 100 performs P2P, that is a direct access with the image display apparatus 120, but the image display apparatus 120 may operate in an interlocked manner with an image receiver such as a Set Top Box (STB). The mobile terminal 100 may directly access the image receiver. The image display apparatus 120 may perform at least one of the mirroring function, and its original functions of displaying contents being reproduced on the screen. Therefore, in the exemplary embodiment, the object that the mobile terminal 100 directly accesses is not limited.

As a result of the aforementioned configuration, when the image display apparatus 120 is connected to a nearby access point 110, the mobile terminal 100 may use the information on the current connected channel to directly access the image display apparatus 120, thereby increasing the speed of access compared to the speed of accessing the image display apparatus 120 as in related art. In other words, Wi-Fi scanning time may be reduced. Furthermore, it is possible to minimize the reduced performance of the Wi-Fi of the image display apparatus 120 functioning as a DTV. For example, it is possible to reduce processing load of data and improve the performance.

With reference to FIG. 1, device 110 and device 120 are connected to each other through a channel/frequency. Device 110 periodically sends the beacon frame which has information about the connected channel/frequency. If device 120 wants to make WiFi direct connection with any new device it can go to the background listening mode for incoming probe request from other device, e.g., device 100. It is optimal if the device 120 is listening for the probe request in the same channel in which it is connected to the access point. It will overcome the overhead (time & power consumption) involved if same channel is used for the WLAN connection with Access Point and background listening for WiFi Direct mode.

Device 100 can know the operating/connected channel for device 110 through the beacon frames. Hence, device 100 sends the probe request to device 120 in the same channel in which it is listening in the background. As a result, WiFi direct connection between device 100 and device 120 can be made faster than the conventional WiFi direct connection procedures.

Figure 3:
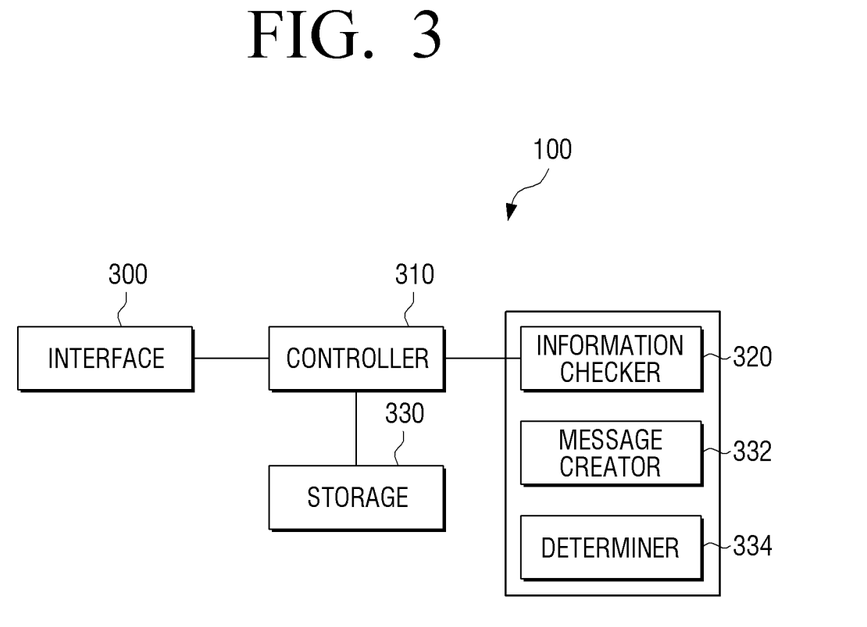
FIG. 3 is a block diagram of a detailed structure of a mobile terminal of FIG. 1.

FIG. 3 is a block diagram of a detailed structure of a mobile terminal of FIG. 1.

With reference to FIGS. 1 and 3, the mobile terminal 100 according to an exemplary embodiment may include a part or entirety of an interface 300, controller 310, information checker 320 and storage 330.

Herein, to include a part or entirety of elements means that some elements such as a storage 330 may be omitted, or some elements such as an information checker 320 may be integrated into another element.

The interface 300 may include a communication interface for performing short distance communication such as Wi-Fi with the access point 110 and for performing Wi-Fi P2P communication for direct access to the image display apparatus 120, and a user interface for performing a user's command. The communication interface will be explained hereinafter, but P2P interface shares physical layer (PHY) channels with the wireless LAN (WLAN) interface. Therefore, the communication interface 300 enables the access point 110 to directly access the image display apparatus 120 by a same channel by which the image display apparatus 120 is connected to the access point 110.

The interface 300 may receive for example a beacon frame included in the beacon signal from the access point 110, and transmit the beacon frame to the information checker 320 under the control by the controller 310. The interface 300 may transmit a probe request message created through the controller 310 or message creator 322, and receive a response message thereto, and transmit the response message to the controller 310. The interface 300, more particularly the communication interface may additionally perform operations such as information conversion such as encoding and decoding of particular information or contents.

The controller 310 controls the operations of the configurative elements inside the interface 300, information checker 320, and storage 330. For example, the controller 310 may transmit the beacon frame input through the interface 300 to the information checker 320. The controller 310 may control the interface 300 to transmit the probe request message to the image display apparatus 120 using the information processed in the information checker 320. When a response message regarding the probe request message is received, the controller 310 may determine that a direct access has been completed and control the image display apparatus 120 to perform a mirroring operation. For this purpose, the controller 310 may perform a program or application stored in the storage 330. In addition, in the case where the user wishes to execute a particular contents stored in the storage 330 through the interface according to the mirroring operation, the controller 310 may control the interface 300 to transmit the executed contents.

The information checker 320 includes at least one of a message creator 332 and determiner 334, and thus the information checker 320 may function as a message processor. The information checker 320 checks the information inside the beacon frame, and the message creator may get involved in creating a message such as a probe request message. The determiner may perform the role of determining whether a response message for the probe request message has been received from the image display apparatus 120.

When for example a direct access by the mobile terminal 100 to the image display apparatus 120 is completed, the storage 330 may store a program or application for performing a mirroring operation of the mobile terminal 100. The storage 330 may store various contents that the user wants. Such contents may be executed by the user selecting particular contents from among the contents inside the mobile terminal 110 displayed on the image display apparatus 120. Besides the aforementioned, the storage 330 may store various pieces of information and data processed in the mobile terminal 100 and output the stored information and data under a control by the controller 310.

Figure 4:
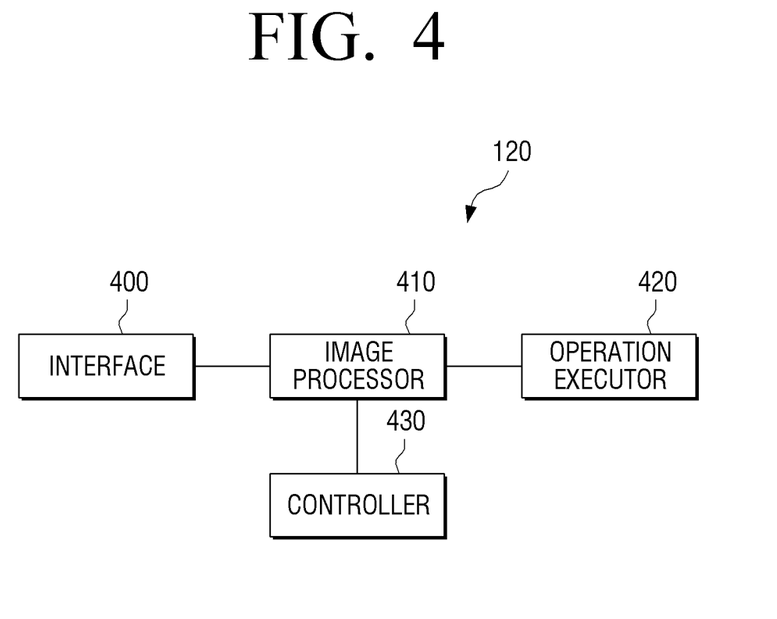
FIG. 4 is a block diagram of a detailed structure of an image display apparatus of FIG. 1.

FIG. 4 is a block diagram of a detailed structure of an image display apparatus of FIG. 1.

With reference to FIGS. 1 and 4, the image display apparatus 120 according to the exemplary embodiment may include an interface 400, image processor 410, display 420, e.g., an operation executor, and controller 430, and may further include a storage (not illustrated). An operation executor may include various elements of the image display apparatus 120 such as a speaker, a sound output unit, etc.

The interface 400 includes a communication interface and a user interface. The communication interface may include a wireless LAN for performing wireless LAN communication such as Wi-Fi with the access point 110, and a Wi-Fi direct module for Wi-Fi P2P communication with the mobile terminal 100. The interface 400 may be provided with data services received through wireless LAN communication, and receive information and data provided from the mobile terminal 100 through P2P communication.

In the interface 400, the wireless LAN module and the Wi-Fi direct module share physical channels. Therefore, the interface 400 receives a request for direct connection from the mobile terminal 100 through the Wi-Fi direct module by a same channel as the current channel by which it is connected to the access point 110 through the wireless LAN module. The image display apparatus 120 completes the direct connection with the mobile terminal 100 as it transmits a response message for the received request. Accordingly, bothersome processes such as the apparatus searching process in related art are reduced, thereby enabling a fast P2P accessing.

In the case of receiving a broadcast signal, the image processor 410 may include a part or entirety of a tuner, demodulator, demultiplexer, audio processor, and video processor. It may further include a voice output unit. The tuner is for selecting the broadcast program selected by the user, and the demodulator is for restoring the broadcast signal demodulated and received, and the demultiplexer is for separating the audio, video and additional information from the broadcast signal. The audio processor and video processor may include a decoder and processor, the decoder for decoding the encoded data, and the processor for scaling and controlling of data.

When the image display apparatus 120 operates as a screen mirror of the mobile terminal 100, the image processor 410 may process the screen data provided from the corresponding mobile terminal 100 and the contents selected by the user, and output the processed screen data to the display 420. In the case where the contents provided from the mobile terminal 100 is HDMI, the image processor 410 may perform only the operations for scaling the noncompressive type contents, and output the same.

The controller 430 may store the additional information processed in the image processor 410 in a separate storage, and may control the storage to combine additional information and output the same when a particular video is displayed on the display 420, when there is a request from the user, or automatically.

When a probe request message is received from the mobile terminal 100, the controller 430 may determine that the probe request message has been received and create a response message for the probe request message, and control such that the response message may be transmitted through the interface 400. Such creation of a response message may be performed in various ways: by a separate message creator, or inside the controller 430.

After transmitting a response message, in response to a request from the mobile terminal 100 to operate for example as a screen mirror, the controller 430 may control the image processor 410 to perform an operation accordingly. In response to screen data of the mobile terminal 100 being provided for operation as a screen mirror, the controller 430 may control such that the screen data is processed and provided to the display 420. The same applies for the contents provided from the mobile terminal 100.

The display 420 includes a liquid crystal panel or an OLED panel. When the image display apparatus 120 is connected to the access point 110 and receives a broadcast program of a particular channel, the display 420 may display the corresponding program. In such a process, when the mobile terminal 100 is directly connected, the display may operate as a screen mirror. Accordingly, on the display 420, the screen of the mobile terminal 100 may be displayed. The display 420 may display the contents executed in the mobile terminal 100, thereby enabling viewing contents from a screen larger than the mobile terminal 100.

Figure 5:
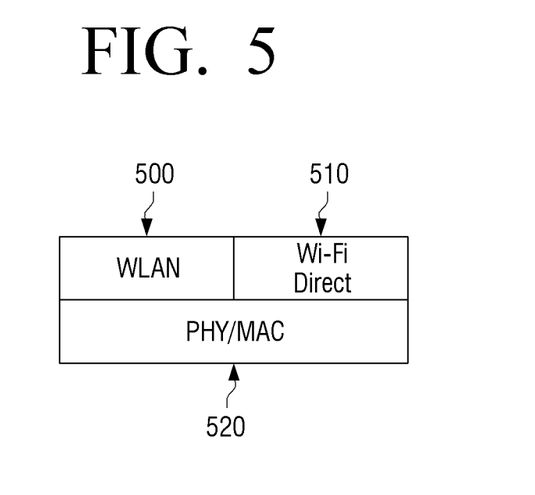
FIG. 5 is a view of an example of a logic hierarchy of an interface of FIGS. 3 and 4.

FIG. 5 is a view of an example of a logic hierarchy of an interface of FIGS. 3 and 4.

With reference to FIGS. 3 and 4, the mobile terminal 100 and the image display apparatus 120 may include a wireless LAN module for performing wireless LAN communication with the access point 110, and a Wi-Fi direct module for performing direct communication by for example, Wi-Fi. The wireless LAN module and Wi-Fi direct module may share physical (PHY) channels.

FIG. 5 is a view of an example of a logic hierarchy of an interface 300, 400 of FIGS. 3 and 4. For example, in the case where the image display apparatus 120 is connected to the access point 110 through the PHY/MAC 520 at a WLAN layer 500 such as a wireless LAN module, and then there is a request for connection through a Wi-Fi direct layer 510 such as a Wi-Fi direct module by a same channel, that is the same PHY/MAC 520, the image display apparatus 120 is capable of performing a direct operation according thereto.

By this, in the case of using Wi-Fi wireless LAN and Wi-Fi direct at the same time, the mobile terminal 100 may reduce the time for Wi-Fi P2P search.

Figure 6:
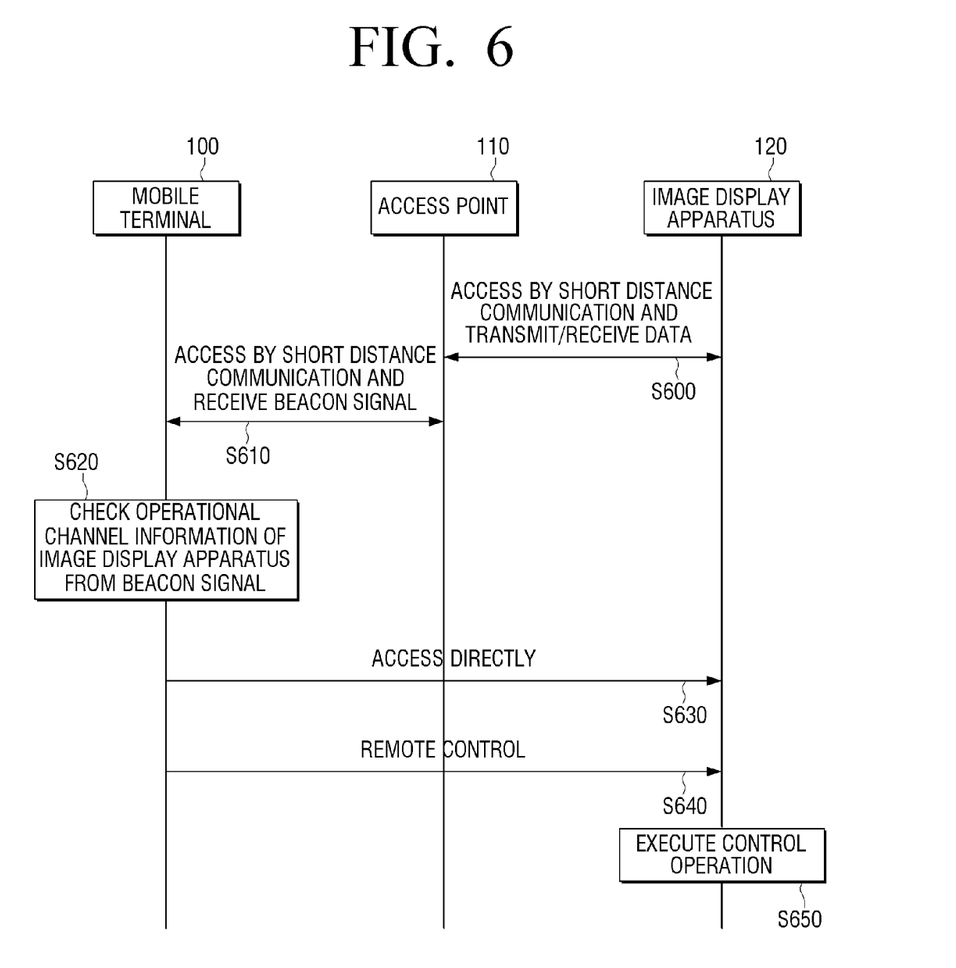
FIG. 6 is a view illustrating a P2P search process according to an exemplary embodiment.

FIG. 6 is a view illustrating a P2P search process according to an exemplary embodiment.

With reference to FIG. 6, the image display apparatus 120 according to the exemplary embodiment may access a nearby access point 110 and transmit or receive data (operation S600). In this process, the image display apparatus 120 receives broadcast data of the channel changed by the user's channel change.

Next, the mobile terminal 100 may access the access point 110 by short distance communication, and receive the beacon signal (operation S610). Herein, the beacon signal may include a type of state information on the image display apparatus 120.

Next, the mobile terminal 100 checks the operational channel information of the image display apparatus 120 from the beacon signal (operation S620). In other words, the mobile terminal 100 checks the information of the channel by which the image display apparatus 120 currently accesses the access point 110, more particularly physical information.

The mobile terminal 100 directly accesses the image display apparatus 120 based on the checked channel information (operation S630).

Next, by remotely controlling the image display apparatus 120, the mobile terminal 100 may execute the operations that the user wants under the control by the mobile terminal 100 (operations S640, S650). For example, the image display apparatus 120 may perform a mirroring operation of the mobile terminal 100.

A general apparatus search process refers to procedures necessary for the Wi-Fi P2P apparatuses to recognize each other and configure connections in order to create Wi-Fi P2P groups. A Wi-Fi P2P apparatus that has entered into the menu for which it wishes to use the Wi-Fi direct function or that has entered into the apparatus search mode by execution of a predetermined application must repeat channel scanning, listening and searching of IEEE 802.11 periodically for a predetermined time and search for a nearby Wi-Fi apparatus. Herein, the basic operations of the apparatus search procedures performed in the process of creating the Wi-Fi P2P groups is performed by exchanging the probe request and the probe response of IEEE 802.11 MAC protocol. Information such as P2P IE, WSC IE and Supp Reg IE are included in the probe request, whereas P2P IE, WSE IE, RSN IE and Supp Reg IE are included in the probe response.

In the exemplary embodiment, the mobile terminal 100 acquires the channel information of the image display apparatus 120 from a nearby access point 110, and thus the aforementioned bothersome procedures may be omitted.

Figure 7:
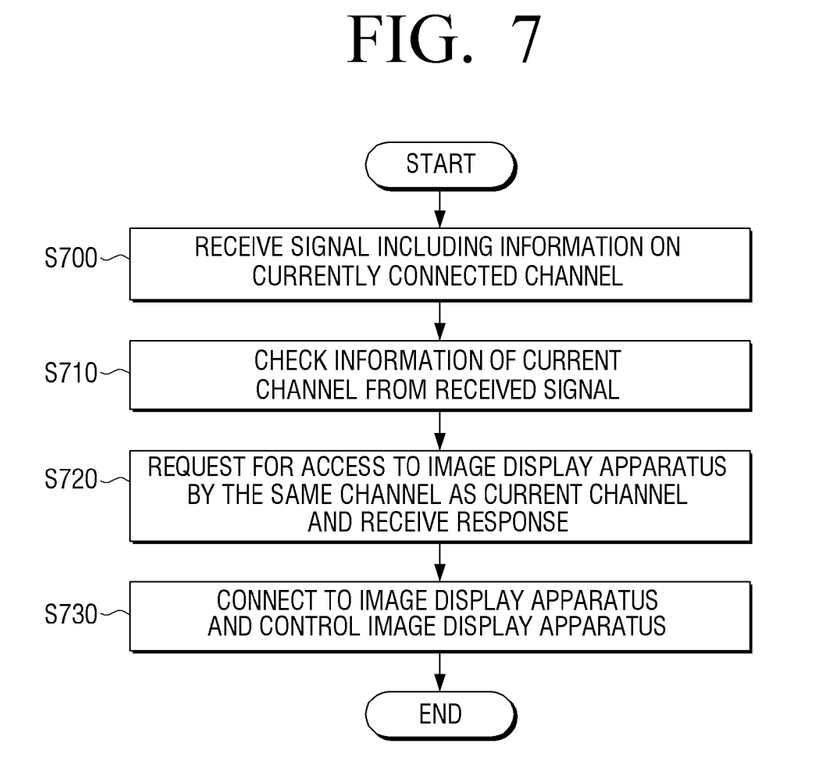
FIG. 7 is a flowchart illustrating a driving method of a mobile terminal according to an exemplary embodiment.

FIG. 7 is a flowchart illustrating a driving method of a mobile terminal according to an exemplary embodiment.

Referring to FIG. 1 and FIG. 7, the mobile terminal 100 according to the exemplary embodiment receives from the access point 110 a signal including information on the current channel by which the image display apparatus 120 is connected to the access point 110 (operation S700). In other words, this may be a process of the mobile terminal 100 checking whether or not the image display apparatus 120 is connected to the access point 110.

Next, from the received signal, the mobile terminal 100 may check whether the image display apparatus 120 that it intends to access is accessed based on apparatus information such as an ID, and if it is determined as accessed, the mobile terminal 100 checks the information on the current channel (operation S710).

The mobile terminal 100 requests the image display apparatus 120 for P2P access by a same channel as the current channel based on the checked information, and receives a response to the request (operation S720).

When the image display apparatus 120 completed preparation for performing communication with the mobile terminal 100 as a result of the response, the mobile terminal 100 becomes capable of controlling the image display apparatus 120 (operation S730). For example, the image display apparatus 120 may be capable of reproducing image contents included inside the mobile terminal 100 under control by the mobile terminal 100.

Figure 8:
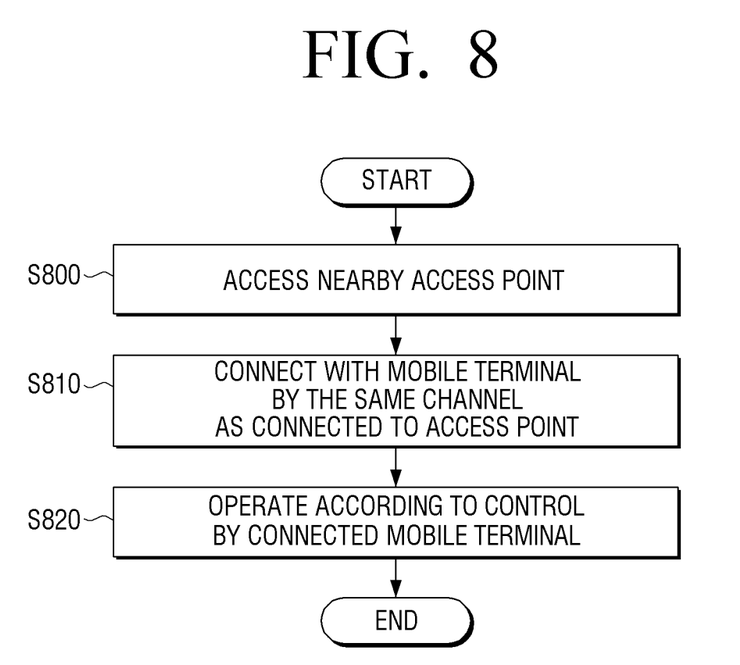
FIG. 8 is a flowchart illustrating a driving method of an image display apparatus according to an exemplary embodiment.

FIG. 8 is a flowchart illustrating a driving method of an image display apparatus according to an exemplary embodiment.

Referring to FIG. 1 and FIG. 8, the image display apparatus 120 according to the exemplary embodiment accesses a nearby access point 110 and receives data (operation S800). Herein, the image display apparatus 120 may change the channel and receive data on the changed channel at a user's request.

In this process, the image display apparatus 120 may perform operations for being connected to the mobile terminal 100 that requested access by a same channel as the channel by which the access point 110 is accessed (operation S810). In other words, when the mobile terminal 100 requests for access, the image display apparatus 120 may make a response thereto, and prepare for bilateral communication.

Next, the image display apparatus 120 becomes capable of operating under the control by the mobile terminal 100 (operation S820). Control operations are described above, and thus further explanation is omitted.

Even though elements that form the exemplary embodiments were described as being integrated into one or as integrally operating, the exemplary embodiments are not limited thereto. That is, as long as it is within the scope of purpose of the exemplary embodiments, at least one of these elements may be selectively combined and may then operate. In addition, these elements may each be realized as one independent hardware, but a part or entirety of each element may be selectively combined to be realized as a computer program having a program module that performs a part or entirety of functions that have been combined by one or more hardware pieces. The codes and code segments that form this computer program may be easily inferred by those skilled in the art. Such a computer program may be stored in a non-transitory computer-readable media and be read and executed by the computer, thereby embodying exemplary embodiments.

A non-transitory computer-readable medium refers to a computer-readable medium that is capable of storing data semi-permanently and not a medium storing data for a short period of time such as a register, cache, and memory etc. More specifically, the aforementioned various applications and programs may be stored in a non-transitory computer-readable medium such as a CD, DVD, hard disk, blu-ray disk, USB, memory card, ROM etc.

Furthermore, although a bus is not illustrated diagram, communication between the configurative elements may be made through a bus. Furthermore, in each device, a processor such as a CPU and microprocessor that performs various operations may be further included.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art. For example, each single component may be separated into multiple components which are then separately implemented. Also, separated components may be combined together and implemented as a single component.

What is claimed is:

1. A mobile terminal communicable with an image processing apparatus connected to an external access point (AP), the mobile terminal comprising:
    a wireless LAN module configured to communicate with the external AP wirelessly;
    a Wi-Fi direct module configured to perform Wi-Fi direct communication;
    a memory configured to store executable instructions; and
    a processor configured to execute the stored instructions, which cause the processor, in response to receiving, from the AP, a wireless connection information, to determine whether the received wireless connection information includes a current connection channel through which the image processing apparatus is currently connected to the AP, to transmit a request, to the image processing apparatus, for direct connection with the image processing apparatus through the current connection channel of the image processing apparatus in response to determining that the received wireless connection information includes the current connection channel, and to establish a direct wireless connection with the image processing apparatus according to an approving result of a response received for the request.

2. The mobile terminal according to claim 1, wherein, in response to the current connection channel being changed, the mobile terminal is configured to connect to the image processing apparatus through the changed channel.

3. The mobile terminal according to claim 1, wherein the mobile terminal is configured to control the image processing apparatus so that contents may be reproduced from the image processing apparatus.

4. The mobile terminal according to claim 1, wherein the mobile terminal is configured to control the image processing apparatus to operate as a screen mirror of the mobile terminal.

5. The mobile terminal according to claim 1, wherein the wireless LAN module is further configured to periodically receive a beacon signal as the wireless connection information.

6. A system comprising:
    an image processing apparatus configured to transmit or receive data with an access point by a current connection channel; and
    a mobile terminal configured to receive, from the AP, a wireless connection information, to determine whether the received wireless connection information includes the current connection channel, and to transmit a request, to the image processing apparatus, for direct connection with the image processing apparatus through the current connection channel of the image processing apparatus in response to determining that the received wireless connection information includes the current connection channel,
    wherein the image processing apparatus is configured to transmit an approving result to the mobile terminal by the current connection channel, in response to an approval to the request for connection.

7. The system according to claim 6, wherein the mobile terminal is configured to perform a direct Wi-Fi connection with the image processing apparatus, through the current connection channel.

8. The system according to claim 6, wherein, in response to the current channel being changed, the mobile terminal is configured to connect to the image processing apparatus through the changed channel.

9. The system according to claim 6, wherein the image processing apparatus is further configured to reproduce contents according to a control by the mobile terminal.

10. The system according to claim 9, wherein the image processing apparatus comprises a display configured to display the reproduced contents or to display a screen of the mobile terminal as a screen mirror.

11. The system according to claim 6, wherein the image processing apparatus is further configured to operate as a screen mirror according to a control by the mobile terminal.

12. A method of a mobile terminal which comprises a processor and is communicable with an image processing apparatus connected to an external access point (AP), the processor is configured to perform the method comprising:
   receiving, from the external AP, a wireless connection information;
   determining whether the received wireless connection information includes a current connection channel, through which the image processing apparatus is currently connected to the external AP;
   transmitting a request, to the image processing apparatus, for direct connection with the image processing apparatus through the current connection channel in response to determining that the received wireless connection information includes the current connection channel; and
   establishing a direct wireless connection with the image processing apparatus according to an approving result of the response for the request.

13. The method according to claim 12, wherein the direct wireless connection is a Wi-Fi direct connection.

14. The method according to claim 12, further comprising:
   in response to the current connection channel of the connected image processing apparatus being changed, connecting to the image processing apparatus through the changed channel.

15. The method according to claim 12, wherein the controlling comprises:
   controlling the image processing apparatus so that contents may be reproduced from the image processing apparatus.

16. The method according to claim 12, wherein the controlling comprises:
   controlling the image processing apparatus to operate as a screen mirror of the mobile terminal.

17. The method according to claim 12, wherein the communicating comprises:
   periodically receiving a beacon frame as the wireless connection information.

\* \* \* \* \*